Dec. 28, 1965  G. H. DOWTY ETAL  3,226,061
STEERABLE UNDERCARRIAGE ASSEMBLIES
Filed June 28, 1962  3 Sheets-Sheet 1

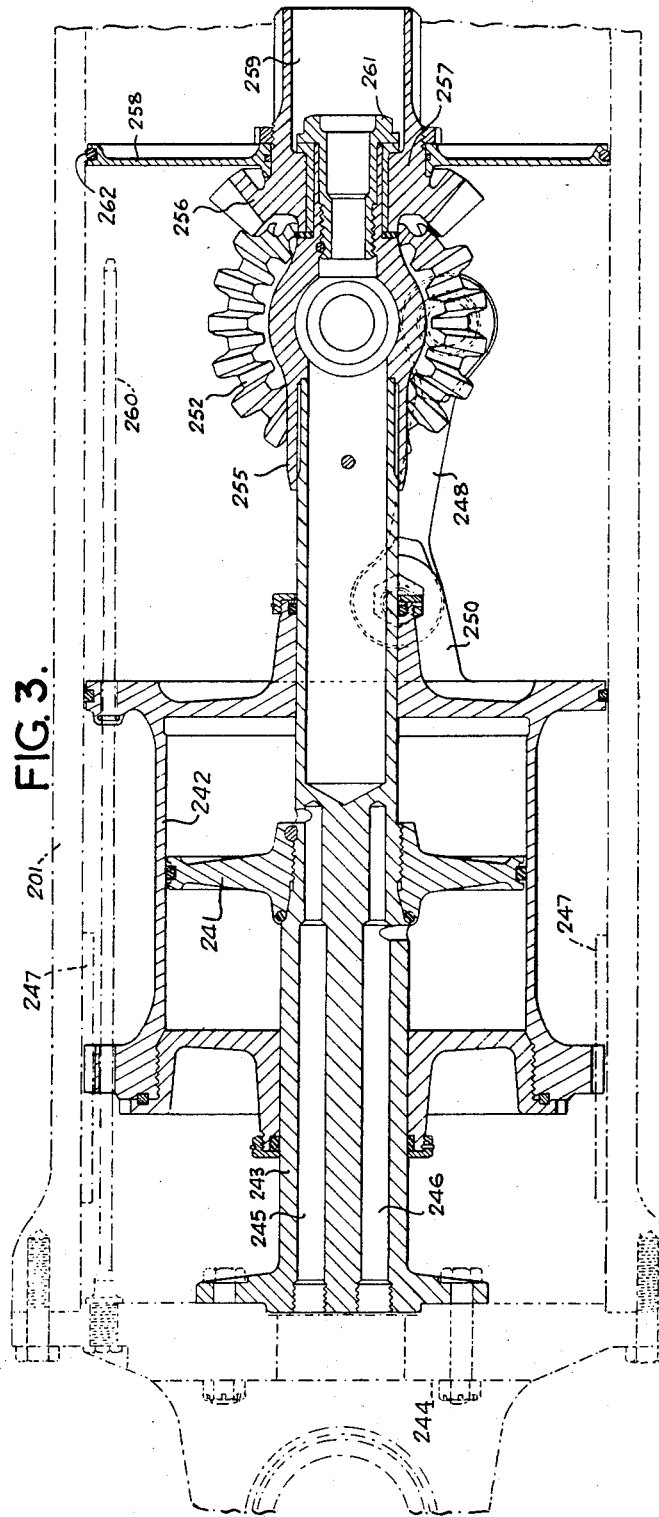

United States Patent Office 3,226,061
Patented Dec. 28, 1965

3,226,061
STEERABLE UNDERCARRIAGE ASSEMBLIES
George Herbert Dowty and Clifford Wilfrid Tinson, Cheltenham, England, assignors to Dowty Technical Developments Limited, Brockhampton Park, near Andoversford, England, a British company
Filed June 28, 1962, Ser. No. 206,021
Claims priority, application Great Britain, July 6, 1961, 24,419/61
8 Claims. (Cl. 244—50)

This invention relates to steerable undercarriage assemblies suitable for an aircraft.

The present invention provides a steerable undercarriage assembly suitable for an aircraft, the assembly including a leg and a steering actuator within the leg, the steering actuator including a fluid-pressure-operated device capable of producing linear movement in a direction parallel to the longitudinal axis of the leg and movement-converting means to convert such linear movement into rotary movement about the longitudinal axis of the leg.

The fluid-pressure-operated device may comprise a piston and cylinder unit capable of producing linear movement in a direction parallel to the longitudinal axis of the leg. The motion converting means may comprise a connecting rod and bevel gear mechanism.

Figure 1:
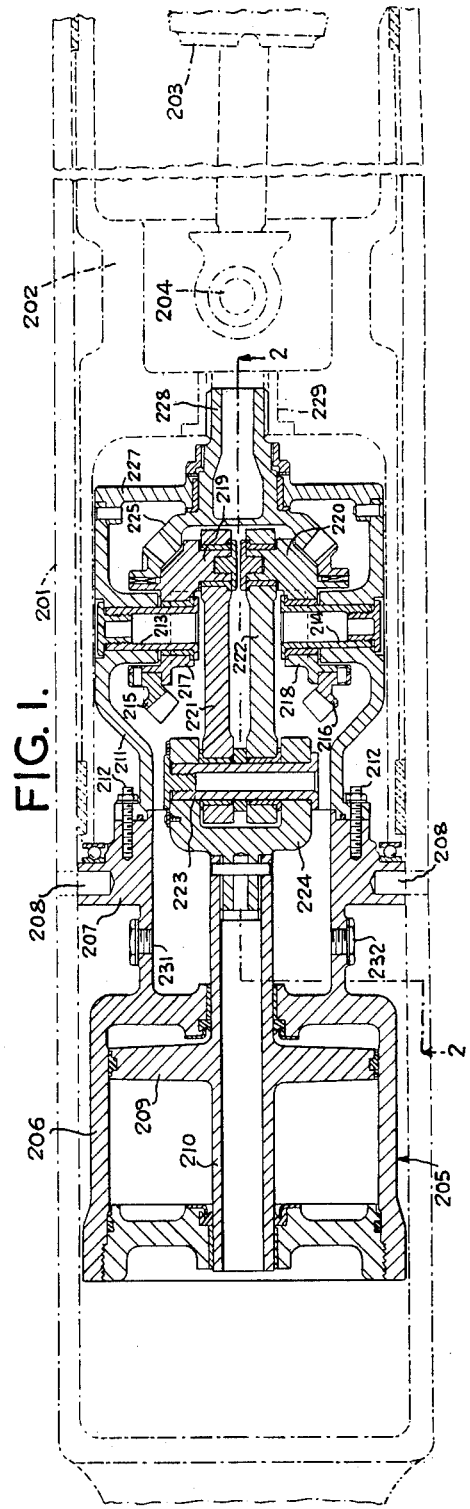
Figure 4:
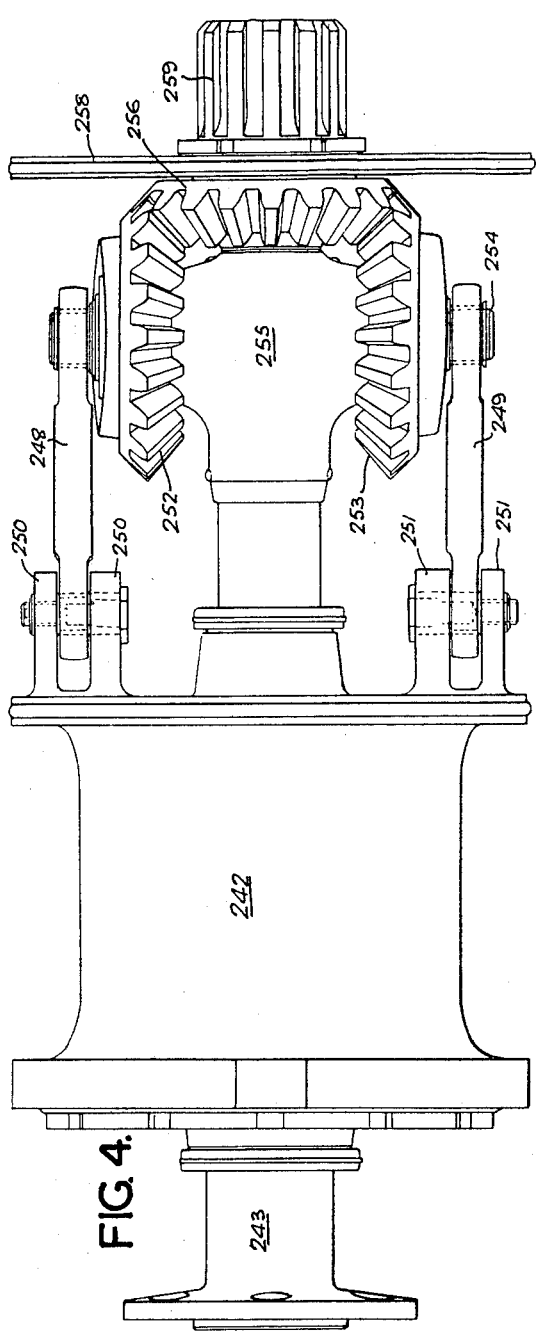
Figure 2:
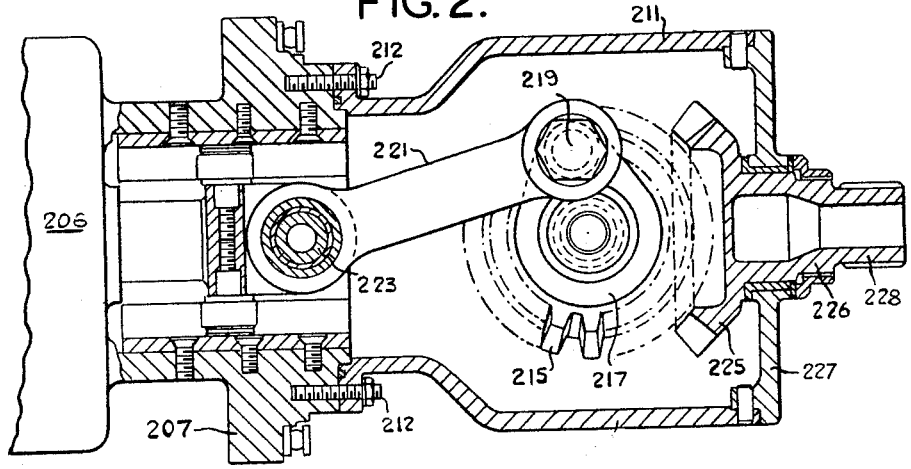

Two embodiments of the present invention will now be described, by way of example, with reference to the accompanying drawings, in which, FIGURE 1 is a sectional view of an aircraft nosewheel undercarriage assembly according to one embodiment of the invention, FIGURE 2 is a similar view of part of the undercarriage assembly taken along the line 2—2 of FIGURE 1, FIGURE 3 is a similar view to FIGURE 1, but showing a second embodiment of the invention, and FIGURE 4 is a plan view of part of the undercarriage assembly of FIGURE 3.

With reference to FIGURES 1 and 2, an aircraft nosewheel undercarriage assembly includes an elongated tubular support member 201, within which is located a turning tube 202. The turning tube 202 is rotatable relative to the support member 201 and carries a nosewheel (not shown) by way of a lever (not shown). A shock absorber 203 is located in a conventional manner within the turning tube 202 and has one end 204 secured to the turning tube and the other end (not shown) secured to the lever of the nosewheel. The above arrangement of the turning tube, shock absorber, nosewheel lever and nosewheel are attached in a manner to ensure directional steering continuity as is described; for example, in U.S. Patent No. 2,652,214 to Cussons.

An actuator, in this instance of the rotary type, for steering the nosewheel is wholly enclosed within the support member 201 and includes a fluid-power-operated means in the form of a piston and cylinder device 205.

The cylinder 206 of the device 205 has an integral extension 207 which is secured to the support member 201 by pins 208, thus fixing the cylinder 206 in the support member 201. The piston 209 of the device 205 is formed integrally with the piston rod 210. When fluid pressure is applied to one or other sides of the piston 209, the piston rod 210 is moved linearly in a direction parallel to the longitudinal axis of the support member 201. The cylinder 206 is co-axial with the support member 201 so that the piston rod 210 moves along the central axis of the support member 201.

A housing 211 is secured by bolts 212 to the extension 207 and two stub-shafts 213, 214 project inwardly from opposite sides of the housing 211 at right angles to the axis of the support member 201. Each stub-shaft 213, 214 carries a bevel gear 215, 216 respectively and a wheel 217, 218 respectively. The wheel 217 is secured to the bevel gear 215 for rotation therewith on the stub-shaft 213 and similarly the wheel 218 is secured to the bevel gear 216. Each wheel 217, 218 has an integral crank pin 219, 220 respectively. To crank pin 219 there is secured one end of a connecting rod 221 and to crank pin 220 there is secured one end of a connecting rod 222. The other end of each connecting rod 221, 222 is pivotally mounted on a shaft 223 carried by a yoke 224 secured to an end of the piston rod 210. The bevel gear 215 and wheel 217 form an angularly movable device to which the connecting rod 221 is pivotally connected and similarly the the bevel gear 216 and wheel 218 form an angularly movable device to which connecting rod 222 is pivotally connected.

The bevel gears 215, 216 are in mesh with a further bevel gear 225 which has an integral extension 226 rotatably mounted in a bearing in an end wall 227 of the housing 211. The bevel gear 225 is rotatable about the axis of the outer casing 201. The extension 226 terminates in a splined or serrated portion 228 which fits into a co-operating socket 229 in the turning tube 202. The connecting rods 221, 222 and the bevel gears 215, 216, 225 form a motion-converting means which converts the linear movement of the piston and cylinder device 205 into rotary movement of the turning tube about the longitudinal axis of the actuator.

To provide for lubrication of the moving parts within the extension 207 and housing 211, two filler plugs 232, 231 are provided.

Steering of the nosewheel will be effected through a suitable steering control arrangement which will be operated by the pilot of the aircraft to which the nosewheel undercarriage assembly is fitted, and which will supply fluid under pressure to one or the other side of the piston 209.

The steering control arrangement may comprise a hydraulic control valve which is operable either mechanically or electrically by a steering selector, which selector is movable by the pilot when steering is required.

In the case of a mechanically-operable control valve, the valve will open when there is an effective angular difference between the position of the steering selector and the position of the nosewheel. The valve immediately closes when the nosewheel has taken up the position selected by the steering selector.

In the case of an electrically-operable control valve, the valve will be opened electromagnetically in accordance with a "difference" signal obtained from angular-position transducers associated with the nosewheel and with the pilot's steering selector.

The nosewheel is capable of castoring freely by the provision of a by-pass connection connecting the chamber formed by the cylinder 206 and one side of the piston 209 with the chamber formed by the cylinder 206 and the other side of the piston 209. This by-pass connection includes a castoring valve which is closed during power steering but is open to allow free flow of fluid from one side of the piston to the other when castoring is required. When the castoring valve is open it will not be possible to open the hydraulic control valve of the steering control arrangement.

In order to steer the nosewheel, fluid pressure is applied by the steering control arrangement to one side or the other of the piston 209, the actual side depending upon the direction in which it is required to steer the wheel.

The fluid pressure causes movement of the piston 209 in the cylinder 206 and hence movement of the yoke 224 towards or away from bevel gear 225 and its extension 226. This movement of the yoke 224 causes an angular movement of the wheels 217, 218 and hence to bevel gears 215, 216 to produce an angular movement of the bevel gear 225. Angular movement of the bevel gear 225 results in a corresponding angular movement of turning tube 202 and hence of the nosewheel. Such movement continues until the hydraulic control valve closes, the nosewheel then being in the position selected by the pilot.

FIGURES 3 and 4 show a modified undercarriage assembly in which, instead of the piston moving relative to a fixed cylinder as in the undercarriage assembly described with reference to FIGURES 1 and 2, the piston 241 is fixed and the cylinder 242 is movable relative to the piston 241. The piston 241 is secured to a piston rod 243 which in turn is secured to a bulkhead 244 in the support member 201. Fluid can be supplied to opposite sides of the piston 241 through conduits 245, 246 in the piston rod 243. The cylinder 242 is slidably movable in the support member 201 on guides 247 secured to the support member. These guides 247 prevent any angular movement of the cylinder 242.

Connecting rods 248, 249 are each pivotally secured at one end to lugs 250, 251 respectively on the cylinder 242 and each pivotally secured eccentrically at the other end to bevel gears 252, 253 respectively rotatably mounted on a shaft 254 carried by an extension 255 secured to the piston rod 243. The shaft 254 is perpendicular to the axis of the piston rod 243. The bevel gears 252, 253 mesh with a bevel gear 256 having an integral extension 257 rotatably mounted on the extension 255 and axially retained by a nut 261. The axis of rotation of the bevel gear 256 is coincident with the axis of the support member 201. The extension 257 terminates in a splined portion 259.

To provide for lubrication of the bevel gears 252, 253 and 256 and adjacent moving parts, an oil chamber is formed by the bulkhead 258, the support member 201 and the seal on the flange 262. A stack pipe 260 is provided so that the oil can be supplied to the chamber in which the bevel gears are located.

Except for the difference mentioned, the actuator functions in a similar manner to the actuator described with reference to FIGURES 1 and 2. It will also be used with a similar steering control to that described with reference to FIGURES 1 and 2.

In both embodiments, the actuator is designed that, for a complete revolution of the bevel gears 252, 253 or the bevel gears 215, 216, the linear travel of the connecting rods is less than the stroke of the piston in the cylinder. The bevel gears 215, 216 each have a 1:1 ratio with bevel gear 225, and the bevel gears 252, 253 each have a 1:1 ratio with bevel gear 256.

When an aircraft fitted with the undercarriage assembly is being towed on the ground, the castoring valve will be open and the nosewheel is capable of turning through one or more complete revolutions about the steering axis without damaging the actuator. Continuous rotation of the nosewheel in the same direction about its steering axis causes continuous rotation of the turning tube and the bevel gears, and consequent continuous reciprocation of the connecting rods and of the piston relative to the cylinder.

Means can also be provided for self-centring of the nosewheel to ensure that it lies in a straight-ahead direction, with respect to an aircraft to which the undercarriage assembly is fitted, before the nosewheel and assembly is retracted into the aircraft. The steering control valve may be employed to this purpose by arranging that, when retraction is selected by the pilot, valve opening is not determined by the effective angular difference between the position of the steering selector and the position of the nosewheel, but is determined by the departure of the nosewheel from its straight-ahead position.

In both the described embodiments of the invention, the actuator has been of the rotary type and comprised a piston and cylinder unit in end to end relation with a movement-converting means which results in an actuator of substantial length as compared with its breadth and depth.

We claim as our invention:

1. A steerable undercarriage assembly, suitable for an aircraft, including a tubular supporting leg, a fluid-pressure-operated device located within the leg and capable of producing linear movement of a part of the device along the leg, a connecting rod pivotally connected at one end to the said part of the fluid-pressure-operated device, a member connectable to a wheel and rotatable about the longitudinal axis of the leg to steer the wheel, and gear means to which the other end of the connecting rod is pivotally connected and which is connected to the member to translate linear movement of the said part into rotary movement of the member and to translate continuous rotation of the member in the same direction into reciprocation of said part.

2. A steerable undercarriage assembly, suitable for an aircraft, including a tubular supporting leg, a fluid-pressure-operated device located within the leg and capable of producing linear movement of a part of the device along the leg, the fluid-pressure-operated device including a cylinder and a piston mounted in and movable relative to the cylinder, a connecting rod pivotally connected at one end to the said part of the fluid-pressure-operated device, a member connectable to a wheel and rotatable about the longitudinal axis of the leg to steer the wheel, and gear means to which the other end of the connecting rod is pivotally connected and which is connected to the member to translate linear movement of the said part into rotary movement of the member and to translate continuous rotation of the member in the same direction into reciprocation of said part.

3. A steerable undercarriage assembly, suitable for an aircraft, including a tubular supporting leg, a fluid-pressure-operated device located within the leg and capable of producing linear movement of a part of the device along the leg, a connecting rod pivotally connected at one end to the said part of the fluid-pressure-operated device, a member connectable to a wheel and rotatable about the longitudinal axis of the leg to steer the wheel, a first gear wheel rotatable about an axis perpendicular to the longitudinal axis of the leg and to which the other end of the connecting rod is pivotally connected, and a second gear wheel meshing with the first gear wheel and rotatable about the longitudinal axis of the leg, the second gear wheel being connected to the member, and the first and second gear wheels operating to translate linear movement of the said part into rotary movement of the member and to translate continuous rotation of the member in the same direction into reciprocation of said part.

4. A steerable undercarriage assembly, suitable for an aircraft, including a tubular supporting leg, a fluid-pressure-operated device located within the leg and including a cylinder fixed relative to the leg, a piston reciprocable in the cylinder, and a piston rod secured to the piston and projecting from the cylinder, the longitudinal axis of the cylinder being parallel to the longitudinal axis of the leg whereby the piston and piston rod move linearly along the leg, a connecting rod pivotally connected at one end to the piston rod of the fluid-pressure-operated device, a member connectable to a wheel and rotatable about the longitudinal axis of the leg to steer the wheel, and gear means to which the other end of the connecting rod is pivotally connected and which is connected to the member to translate linear movement of the piston and piston rod into rotary movement of the member and to translate continuous rotation of the member in the same direction into reciprocation of the piston rod and the piston.

5. A steerable undercarriage assembly, suitable for an aircraft, including a tubular leg, a fluid-pressure-operated device located within the leg and including a cylinder movable linearly along the leg, and a piston mounted within the cylinder, the piston being fixed relative to the leg, a connecting rod pivotally connected at one end to the cylinder of the fluid-pressure-operated device, a member connectable to a wheel and rotatable about the longitudinal axis of the leg to steer the wheel, and gear means to which the other end of the connecting rod is pivotally connected and which is connected to the member to translate linear movement of the cylinder into rotary movement of the member and to translate continuous rotation of the member in the same direction into reciprocation of the cylinder.

6. A steerable undercarriage assembly, suitable for an aircraft, including a tubular supporting leg, a fluid-pressure-operated device located within the leg and capable of producing linear movement of a part of the device along the leg, the fluid-pressure-operated device including a cylinder and a piston mounted in and movable relative to the cylinder, a connecting rod pivotally connected at one end to the said part of the fluid-pressure-operated device, a member connectable to a wheel and rotatable about the longitudinal axis of the leg to steer the wheel, a first gear wheel rotatable about an axis perpendicular to the longitudinal axis of the leg and to which the other end of the connecting rod is pivotally connected, and a second gear wheel meshing with the first gear wheel and rotatable about the longitudinal axis of the leg, the second wheel being connected to the member, and the first and second gear wheels operating to translate linear movement of the said part into rotary movement of the member and to translate continuous rotation of the member in the same direction into reciprocation of said part.

7. A steerable undercarriage assembly, suitable for an aircraft, including a tubular leg, a fluid-pressure-operated device located within the leg and capable of producing linear movement of a part of the device along the leg, a connecting rod pivotally connected at one end to the said part of the fluid-pressure-operated device, a member connectable to a wheel and rotatable about the longitudinal axis of the leg to steer the wheel, a first gear wheel rotatable about an axis perpendicular to the longitudinal axis of the leg and to which the other end of the connecting rod is pivotally connected, and a second gear wheel meshing with the first gear wheel and rotatable about the longitudinal axis of the leg, the second gear wheel being connected to the member and the first and second gear wheels being sized to produce a 1:1 gear ratio and operating to translate linear movement of the said part into rotary movement of the member and to translate continuous rotation of the member in the same direction into reciprocation of said part.

8. A steerable undercarriage assembly, suitable for an aircraft, including a tubular leg, a fluid-pressure-operated device located within the leg and capable of producing linear movement of a part of the device along the leg, the fluid-pressure-operated device including a cylinder and a piston mounted in and movable relative to the cylinder, a connecting rod pivotally connected at one end to the said part of the fluid-pressure-operated device, a member connectable to a wheel and rotatable about the longitudinal axis of the leg to steer the wheel, a first gear wheel rotatable about an axis perpendicular to the longitudinal axis of the leg and to which the other end of the connecting rod is pivotally connected, and a second gear wheel meshing with the first gear wheel and rotatable about the longitudinal axis of the leg, the second gear wheel being connected to the member, and the first and second gear wheels being sized to produce a 1:1 gear ratio and operating to translate linear movement of the said part into rotary movement of the member and to translate continuous rotation of the member in the same direction into reciprocation of said part.

References Cited by the Examiner

UNITED STATES PATENTS

| | | | |
|---|---|---|---|
| 776,118 | 11/1904 | Daley. | |
| 2,518,623 | 8/1950 | Judge | 244—17.17 |
| 2,687,857 | 8/1954 | Caldwell et al. | 244—50 |
| 2,747,549 | 5/1956 | Gerry et al. | 244—50 X |
| 2,747,818 | 5/1956 | Grudin | 244—50 |
| 2,763,449 | 9/1956 | Fullam et al. | 74—99 X |
| 2,970,792 | 2/1961 | Holmes | 244—50 |

FOREIGN PATENTS

| | | |
|---|---|---|
| 1,229,437 | 3/1960 | France. |
| 885,568 | 12/1961 | Great Britain. |

MILTON BUCHLER, *Primary Examiner.*

FERGUS S. MIDDLETON, *Examiner.*